United States Patent
Huang et al.

(10) Patent No.: US 9,928,209 B2
(45) Date of Patent: Mar. 27, 2018

(54) PRE-BUFFERING OF CONTENT DATA ITEMS TO BE RENDERED AT A MOBILE TERMINAL

(71) Applicant: TELEFONAKTIEBOLAGET L M ERICSSON (PUBL), Stockholm (SE)

(72) Inventors: Vincent Huang, Sollentuna (SE); Rickard Cöster, Hägersten (SE); Tony Larsson, Upplands Väsby (SE); Mona Matti, Nacka (SE); Subramanian Shivashankar, Chennai (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 165 days.

(21) Appl. No.: 14/441,103

(22) PCT Filed: Nov. 7, 2012

(86) PCT No.: PCT/EP2012/072036
§ 371 (c)(1),
(2) Date: May 6, 2015

(87) PCT Pub. No.: WO2014/071971
PCT Pub. Date: May 15, 2014

(65) Prior Publication Data
US 2015/0301981 A1    Oct. 22, 2015

(51) Int. Cl.
*H04L 29/08*    (2006.01)
*G06F 15/167*    (2006.01)
(Continued)

(52) U.S. Cl.
CPC ............ *G06F 15/167* (2013.01); *H04L 67/10* (2013.01); *H04L 67/2842* (2013.01);
(Continued)

(58) Field of Classification Search
CPC .......... H04N 21/23406; H04N 21/647; H04N 21/2393; H04N 21/4392; H04N 21/231; H04N 21/44004; H04L 65/4084
See application file for complete search history.

(56) References Cited

U.S. PATENT DOCUMENTS

| | | | | |
|---|---|---|---|---|
| 5,805,821 A | * | 9/1998 | Saxena | .............. H04N 7/17336 348/E5.008 |
| 2006/0248214 A1 | * | 11/2006 | Jackson | .............. H04L 65/4084 709/231 |

(Continued)

OTHER PUBLICATIONS

International Search Report and Written Opinion issued in corresponding application No. PCT/EP2012/072036 dated Jul. 16, 2013, 8 pages.

*Primary Examiner* — Chris Parry
*Assistant Examiner* — Stephen Houlihan
(74) *Attorney, Agent, or Firm* — Patent Portfolio Builders, PLLC (57) ABSTRACT

The present invention relates to methods and devices for pre-buffering one or more content data items to be rendered at a mobile terminal. In a first aspect of the present invention, a mobile terminal (11, 12, 13) comprises a processing unit (15) arranged to acquire a probability with which at least one selected content data item of the one or more content data items is to be rendered at the mobile terminal, and to acquire an estimated point in time when the at least one selected content data item is to be rendered at the mobile terminal. Further, the processing unit is arranged to pre-buffer a first selected part of the at least one selected content data item in the mobile terminal such that the first selected part of the at least one selected content data item is ready for rendering at the estimated point in time, the extent of the pre-buffered first selected part being related to the probabil- (Continued)

ity with which the at least one selected content data item is to be rendered at the mobile terminal.

18 Claims, 3 Drawing Sheets

(51) Int. Cl.
*H04N 21/414* (2011.01)
*H04N 21/647* (2011.01)

(52) U.S. Cl.
CPC ... *H04L 67/2847* (2013.01); *H04N 21/41407* (2013.01); *H04N 21/64784* (2013.01)

(56) References Cited

U.S. PATENT DOCUMENTS

| | | | |
|---|---|---|---|
| 2009/0059941 A1* | 3/2009 | Callaway | H04L 51/12 370/412 |
| 2012/0009890 A1 | 1/2012 | Curcio et al. | |
| 2012/0151539 A1* | 6/2012 | Funge | H04N 21/4307 725/109 |
| 2013/0212484 A1* | 8/2013 | Joshi | G06F 9/541 715/740 |
| 2014/0045475 A1* | 2/2014 | Anthony, Jr. | H04L 67/2842 455/418 |

\* cited by examiner

PRE-BUFFERING OF CONTENT DATA ITEMS TO BE RENDERED AT A MOBILE TERMINAL

CROSS REFERENCE TO RELATED APPLICATION(S)

This application is a 35 U.S.C. § 371 National Phase Entry Application from PCT/EP2012/072036, filed Nov. 7, 2012, the disclosure of which is incorporated by reference.

TECHNICAL FIELD

The present invention relates to methods of, and devices for, pre-buffering one or more content data items to be rendered at a mobile terminal.

BACKGROUND

With the increased availability of smart phones, tablets and laptops in mobile data-/telecommunication networks, data traffic in the mobile networks is rapidly increasing. A mobile phone is no longer used exclusively to make to phone calls and send short messages, but is utilized for instance for watching video clips and streaming media, such as audio and video. During busy hours, the network can be overloaded and thus become congested due to increased quantities of data. Therefore, it is desirable for network operators to balance the traffic load by pre-buffering user content to the smart phones during off-peak hours when the network traffic load is lighter in order for the user to subsequently render the content at a desired point in time.

Pre-buffering user content is generally based on the prediction of user consumption behaviour. Since the network has limited capacity and the mobile phone has limited storage space, it must be determined which content data items, such as audio or video items, to be pre-buffered. The current solution to this problem is to rank the items to be downloaded by an associated probability that the user will want to render a particular item and pre-buffer the highest ranked items for subsequent rendering. This ranking may be embodied in the form of a list where, e.g., ten items are sorted according to their associated rendering probability. Thereafter, a buffer of the mobile phone will be filled with a selected couple of high-ranked content data items, such that the user subsequently can render these selected items.

The probabilities used for ranking items for download are typically acquired from recommender systems, also known as recommendation systems, and are determined based on user preferences, user behaviour, social network information, event calendars, editorials, campaigns, and other types of recommendations, as is known in the art. Such recommender systems may be implemented by means of collaborative or content-based filtering, or a combination thereof, referred to as hybrid recommender systems.

However, since the accuracy of the predictions is normally quite low, the benefits from pre-buffering are small. Prior art pre-buffering methods used could in fact increase the total network traffic load and reduce mobile phone battery life, in particular when the downloaded content is represented by a large quantity of data and/or the prediction accuracy is low.

SUMMARY

An object of the present invention is to solve, or at least mitigate these problems in the art and provide an improved method and device for pre-buffering content data items.

This objective is attained in a first aspect of the present invention by a mobile terminal for pre-buffering one or more content data items to be rendered at the mobile terminal. The mobile terminal comprises a processing unit arranged to acquire a probability with which at least one selected content data item of the one or more content data items is to be rendered at the mobile terminal, and to acquire an estimated point in time when the at least one selected content data item is to be rendered at the mobile terminal. Further, the processing unit is arranged to pre-buffer a first selected part of the at least one selected content data item in the mobile terminal such that the first selected part of the at least one selected content data item is ready for rendering at the estimated point in time, the extent of the pre-buffered first selected part being related to the probability with which the at least one selected content data item is to be rendered at the mobile terminal.

This object is attained in a second aspect of the present invention by a method of pre-buffering one or more content data items to be rendered at a mobile terminal. The method comprises acquiring a probability with which at least one selected content data item of the one or more content data items is to be rendered at the mobile terminal, and acquiring an estimated point in time when the at least one selected content data item is to be rendered at the mobile terminal. Further, the method comprises pre-buffering a first selected part of the at least one selected content data item in the mobile terminal such that the first selected part of the at least one selected content data item is ready for rendering at the estimated point in time, the extent of the first selected part being related to the probability with which said at least one selected content data item is to be rendered at the mobile terminal.

This objective is attained in a third aspect of the present invention by a network node arranged to pre-buffer one or more content data items to be rendered at a mobile terminal. The network node comprises a processing unit arranged to acquire a probability with which at least one selected content data item of the one or more content data items is to be rendered at the mobile terminal, and to acquire an estimated point in time when the at least one selected content data item is to be rendered at the mobile terminal. Further, the processing unit is arranged to pre-buffer a first selected part of the at least one selected content data item such that the first selected part of the at least one selected content data item is ready for rendering at the estimated point in time, the extent of the pre-buffered first selected part being related to the probability with which the at least one selected content data item is to be rendered at the mobile terminal. Moreover, the processing unit is arranged to send the pre-buffered first selected part of the at least one selected content data item to the mobile terminal such that the pre-buffered first selected part can be rendered at the estimated point in time.

This object is attained in a fourth aspect of the present invention by a method of pre-buffering one or more content data items to be rendered at a mobile terminal. The method comprises acquiring a probability with which at least one selected content data item of the one or more content data items is to be rendered at the mobile terminal, and acquiring an estimated point in time when the at least one selected content data item is to be rendered at the mobile terminal. Further, the method comprises pre-buffering a first selected part of the at least one selected content data item in a network node other than the mobile terminal such that the first selected part of the at least one selected content data item is ready for rendering at the estimated point in time, the extent of the pre-buffered first selected part being related to the probability with which the at least one selected content data item is to be rendered at the mobile terminal, and sending the pre-buffered first selected part of the at least one selected content data item to the mobile terminal such that the pre-buffered first selected part can be rendered at the estimated point in time.

Thus, it is determined whether a user would want to render a particular content data item, such as a video or an audio item, at a subsequent point in time on a mobile terminal, for example a mobile phone, a tablet or a computer, based on an estimated probability measure. That is, an estimated probability with which the user would want to render the content is acquired. Further, an estimated point in time when the user wishes to render the particular content data item is acquired. The estimated probability and the estimated point in time are acquired from a recommender system which estimates the probability with which the user would want to render the particular content data item, and the point in time when the user wishes to render the particular content data item. The recommender system may be based on collaborative filtering, content-based filtering, or a combination thereof, as is known in the art, and may reside in the mobile terminal. Further, the recommender system may be provided by a third party, e.g., a social network or a content provider. It will also be appreciated that the estimated probability and the estimated point in time may be acquired from different recommender systems.

Given these prerequisites, a first selected part of the content data item is pre-buffered in the mobile terminal such that the user can start rendering the selected content data item at the point in time previously estimated. The extent to which the first selected part of the selected content data item is pre-buffered at the mobile terminal is related to the acquired probability with which the user wishes to render the selected content data item. More specifically, the extent to which the first selected part of the selected content data items is pre-buffered is determined by the estimated probability and by the estimated probabilities for further selected content data items. To this end, given a number of content data items are selected for pre-buffering based on their respective estimated probabilities, the content data item having the highest probability will have the largest first selected part associated with it, the content data item having the next-highest probability will have the next-largest first selected part associated with it, and so forth.

Alternatively, the selected first part of the selected content data item is pre-buffered in a network node other than the mobile terminal, such as in a radio base station (RBS), for example a NodeB, an eNode B or a base transceiver station (BTS), or a supervising entity such as radio network controller (RNC) or a base station controller (BSC), and subsequently sent to the mobile terminal for rendering. Further, as an alternative to what is mentioned hereinabove regarding the residency of the recommender system, the recommender system may reside in any of these exemplifying network nodes.

Advantageously, by partially pre-buffering one or more selected content data items based on the estimated probability that the user subsequently would want to render the selected content data item(s), the traffic load is better balanced and the quantity of data which unnecessarily has been pre-buffered in the network node/mobile terminal, should the user ultimately not want to render the content item, is reduced, further improving battery life of the mobile terminal. Thus, as an illustration, even though the total quantity of pre-buffered data in the network node/mobile terminal may be the same when implementing embodiments of the present invention as compared to the previously described method of pre-buffering data; instead of fully downloading a selected few content data items as is done in the art, a greater number of partially downloaded selected content data items are held in a buffer of the network node/mobile terminal in the present invention.

Further advantageous is that since only a selected part of a respective selected data content item has been pre-buffered for rendering at a subsequent point in time, a certain degree of freedom is admitted for scheduling downloading of a remaining part of the selected data content item(s) when the user actually is rendering the pre-buffered item, resulting in useful scheduling margins which enable optimization of total network utilization.

As previously mentioned, selected content data items could be pre-buffered in a smart phone, table, laptop, User Equipment (UE), media player, etc., i.e. in a mobile terminal in which the content data items will be rendered by the user. However, selected content data items could alternatively be pre-buffered in a radio base station (RBS), such as a NodeB, an eNode B or a base transceiver station (BTS), or a supervising entity such as radio network controller (RNC) or a base station controller (BSC). These alternatives may be advantageous for a plurality of reasons; for instance, in comparison to fetching data at a media server, a large number of mobile terminals could consume content data items pre-buffered at a NodeB without having to go far up in the communications network. Hence, congestion further up in the network can be avoided. Further, when the user makes a request for the particular content data item, the NodeB will not have to fetch the item (or at least the pre-buffered first part of the item) via the Internet; it is already stored at the NodeB. In yet another alternative, the content data items could be pre-buffered in a proxy server located outside the radio access network (RAN) in which the mobile terminal is located, which proxy server receives data to be distributed in the RAN from a media server storing a great amount of content data items. This alternative is advantageous in that a content provider server, i.e., the media server, could be a bottleneck in a network where content data items are delivered to consumers. By implementing the method of pre-buffering content data items according to embodiments of the present invention in a proxy server acting as an interface between the RAN and the content provider server, traffic load on the content provider server is better balanced in that selected content data items can be partially buffered at the proxy server during periods when network load is relatively low.

In an example of the method of pre-buffering content data items according to embodiments of the present invention, a consumer of content, Bob, is recommended by his friend David to watch a video clip via a social network such as Facebook. Since Bob prefers a similar type of content as David with respect to for instance type of music or movies, the probability that Bob will watch the recommended clip is considered high, an estimated 90%. Bob normally watches video clips on his tablet on his way to and from work, i.e. either between 7 am and 8 am or between 5 pm and 6 pm, and during lunch hour which typically takes place between 12 pm and 1 pm. Based on this to information, it may be determined that 45% of the selected content data item is pre-buffered in the tablet such that Bob can start rendering the selected content data item at 7 am when he gets on his commuter train to work. If for instance a second selected content data item has an associated rendering probability for Bob of an estimated 80%, it may be determined that 40% of the selected item is pre-buffered for rendering at 7 am, while a third selected content data item has an associated rendering probability of an estimated 50%, wherein 25% of the selected item is pre-buffered for rendering at 7 am, and so on. Thus, the extent to which a selected content data item is pre-buffered is typically proportional to the estimated rendering probability.

In a further example, 90% of the first selected content data item is pre-buffered for rendering at 7 am, while 80% of the second selected content data item is pre-buffered and 50% of the third selected content data item is pre-buffered.

It should be noted that these are two examples used for illustrating embodiments of the present invention and the relation between the estimated probability with which a selected content data item is to be rendered, and the extent to which the selected content data item is pre-buffered such that it is ready for rendering at the estimated point in time, could taken on many forms. However, a piece of content with a higher estimated rendering probability will be pre-buffered to a relatively higher extent than a piece of content with a lower estimated rendering probability.

As will be shown in the following, other parameters will be taken into account when determining the extent to which a selected piece of content is pre-buffered, such as network load conditions, i.e., available network bandwidth, other parameters which can affect the probability include size of network node/mobile terminal buffer, availability of content, total size of the selected content data item, total rendering time, how many selected content data items that are to be pre-buffered such that they can be rendered at the estimated point in time, etc.

In an embodiment of the present invention, at least a second selected part of the selected content data item is buffered at the network node/mobile terminal while the pre-buffered first selected part is being rendered. Advantageously, the user will be able to render the complete content item, if desired, but a majority of the content item has most likely been pre-buffered in the network node/mobile terminal during a period when a higher bandwidth was available in the network, while the second part constituting a minority part of the selected content data item is downloaded when the user is rendering the first part, which generally takes place during a time period when the available network bandwidth is lower. It should be noted that in an embodiment of the present invention, the second part constitutes the remaining part of the content data item. However, as implied by this particular embodiment, if for some reason the user does not render the first selected part of the selected content item at the estimated point in time, or renders only a subset of the first part, the remaining part of the content may not be downloaded to the network node/mobile terminal at this particular stage, but at a subsequent moment in time when the user decides to finish rendering the first part of the selected content data item, for instance between 5 pm and 6 pm on his way home. In a further embodiment, the second part of the selected content data item is not the remaining part. In this particular embodiment, the second part is downloaded to an appropriate extent while the user renders the first part. However, after having rendered most of the second part, the user stops the rendering. In this situation, it could be advantageous to download a further part (possibly being the remaining part) of the content data item at a later stage, when the there is higher available bandwidth in the network. For instance, a first part of the selected content data item is pre-buffered between 4 am and 5 am when network traffic load generally is low. The user subsequently renders the first part starting at 7 am, and completes the rendering of the first part, wherein the downloading of the second part commences, which typically is initiated just before the first part finishes such that seamless rendering is enabled at the mobile terminal (even though downloading of the second selected part very well may start already when the user starts rendering the first selected part). As previously described, after having rendered most of the second part, the user stops the rendering. When travelling home from work at 5 pm, the user resumes the rendering of the (downloaded) second part of the content data item and when the second part is about to finish, a third part (possibly the remaining part) is downloaded and rendered. This embodiment is advantageous in that the network traffic load can be balanced to an even higher extent, since the load is distributed over a greater time period. As is understood, it can be envisaged that the selected content data item can be downloaded as even further individual parts than the three exemplified in this particular embodiment.

In a further embodiment of the present invention, the acquired probability is compared to a probability threshold value; wherein the first part of the at least one content data item is pre-buffered if the acquired probability exceeds the probability threshold value. Advantageously, it is determined whether the probability that the selected content data item is to be rendered at the mobile terminal is considered high enough, i.e. whether the probability exceeds the probability threshold value, in which case the selected data content item is pre-buffered. For instance, if the probability does not exceed, say, 30%, the likelihood that the user will want to render the content is considered too low, and consequently the risk that a pre-buffered part of a selected content data item will not be rendered and thus having been pre-buffered in vain is too high.

In still another embodiment of the present invention, an available bandwidth measure is determined for a network in which the network node/mobile terminal is located. By analyzing the determined available network bandwidth measure, qualified decisions when to actually download the first part of the selected content data item can be taken such that the pre-buffering of the first part of the content data item is undertaken during time periods when the available network bandwidth measure is considered sufficiently high. The determination whether the available network bandwidth measure is considered sufficiently high is in an embodiment undertaken by comparing the measure to a bandwidth threshold value; if the available network bandwidth measure exceeds the bandwidth threshold value, the available bandwidth is considered high enough. Advantageously, in order to better balance network traffic load and in particular to reduce the traffic during peak hours, it is desired that content data items can be pre-buffered at the network node/mobile terminal during the off-peak hours. Thus, by determining a measure of available bandwidth for the network in which the network node/mobile terminal is located, it is possible to schedule pre-buffering such that downloading is undertaken during time periods when the available bandwidth in the network is relatively high.

In still a further embodiment of the present invention, the extent to which the first selected part of a selected content data item is pre-buffered is further related to the determined available network bandwidth measure. This measure can take into consideration both the available bandwidth at off-peak hours, which generally can take place hours before the point in time when the pre-buffered content data item is to be rendered, as well as available bandwidth at the actual point in time of rendering. This is highly advantageous in that the balancing network traffic load can be even further improved, since not only the time period when the first part of the content data item is to be pre-buffered is estimated, but further the extent to which the first selected part is pre-buffered at the network node/mobile terminal.

In an example of the method of pre-buffering content data items according to embodiments of the present invention, which is an extension of previously given examples, Bob is again recommended by his friend David to watch a video clip via a social network. Since Bob prefers a similar type of content as David with respect to for instance type of music or movies, the probability that Bob will watch the recommended clip is considered high, an estimated 90%. Bob normally watches video clips on his tablet on his way to and from work, i.e. either between 7 am and 8 am or between 5 pm and 6 pm, and during lunch hour which typically takes place between 12 pm and 1 pm. In this example, it is further considered that the available bandwidth capacity at the estimated point in time when the content is to be rendered, i.e. at 7 am, is only 10%. Thus, it is predicted that bandwidth resources are relatively scarce at the time of rendering the content. In this particular example, it is decided that e.g. a further 20% of the selected content data item is pre-buffered in the tablet, i.e. 1.2×45%=54%, as compared to 45% in the previously given example. With this embodiment, the load on the network will advantageously be better balanced, since the first part of the content item is pre-buffered to a higher extent at off-peak hours, while a relatively smaller remaining part of the selected content data item is downloaded at an instant in time when the available bandwidth capacity is expected to be low.

Conversely, if the available bandwidth capacity at the estimated point in time when the content is to be rendered is high, say 80%, it can be determined that a smaller part is to be pre-buffered, e.g. 0.8×45%=36%, as compared to the previously discussed 45%. With this embodiment, the load on the network will advantageously be better balanced, since the first part of the content item is pre-buffered to a lower extent at off-peak hours, while a relatively greater remaining part of the selected content data item is downloaded at an instant in time when the available bandwidth capacity is expected to be high.

The estimated probability with which the selected content data items are to be rendered at the mobile terminal is generally based on information acquired from various recommender systems. The probability that a user would want to render a content item is determined by a plurality of different factors. A content item could be a video clip, an application download or update, web page download, calendar synchronization, email, audio, etc.

Factors that are typically included in recommender systems include: user preferences regarding content items that the user regularly downloads or requests, user behavior, social network information, collaborative and content-based filtering, event calendars, editorials, campaigns and other external recommendations, etc. The probability that a user will want to render a content data item, and that a selected content data item thus is pre-buffered in accordance with embodiments of the present invention, can be calculated by means of considering one or more of these factors. Each factor can be calculated using known methods.

Further, traffic load prediction has been studied extensively in the art for network planning and capacity management. There are many existing methods that can be applied for predicting network traffic load. Many of the known methods are based on historical data, and adopt time series analysis or neural network analysis for prediction. Other methods, such as survey methods, analogous methods, can also be used.

It should further be noted that the selected part(s) of the selected content data item(s) which are downloaded not necessarily are a sequence of bytes starting with the very first byte of the item to be downloaded, but could alternatively be e.g. the last bytes of the item, or the first part plus some other part that is most relevant to download.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
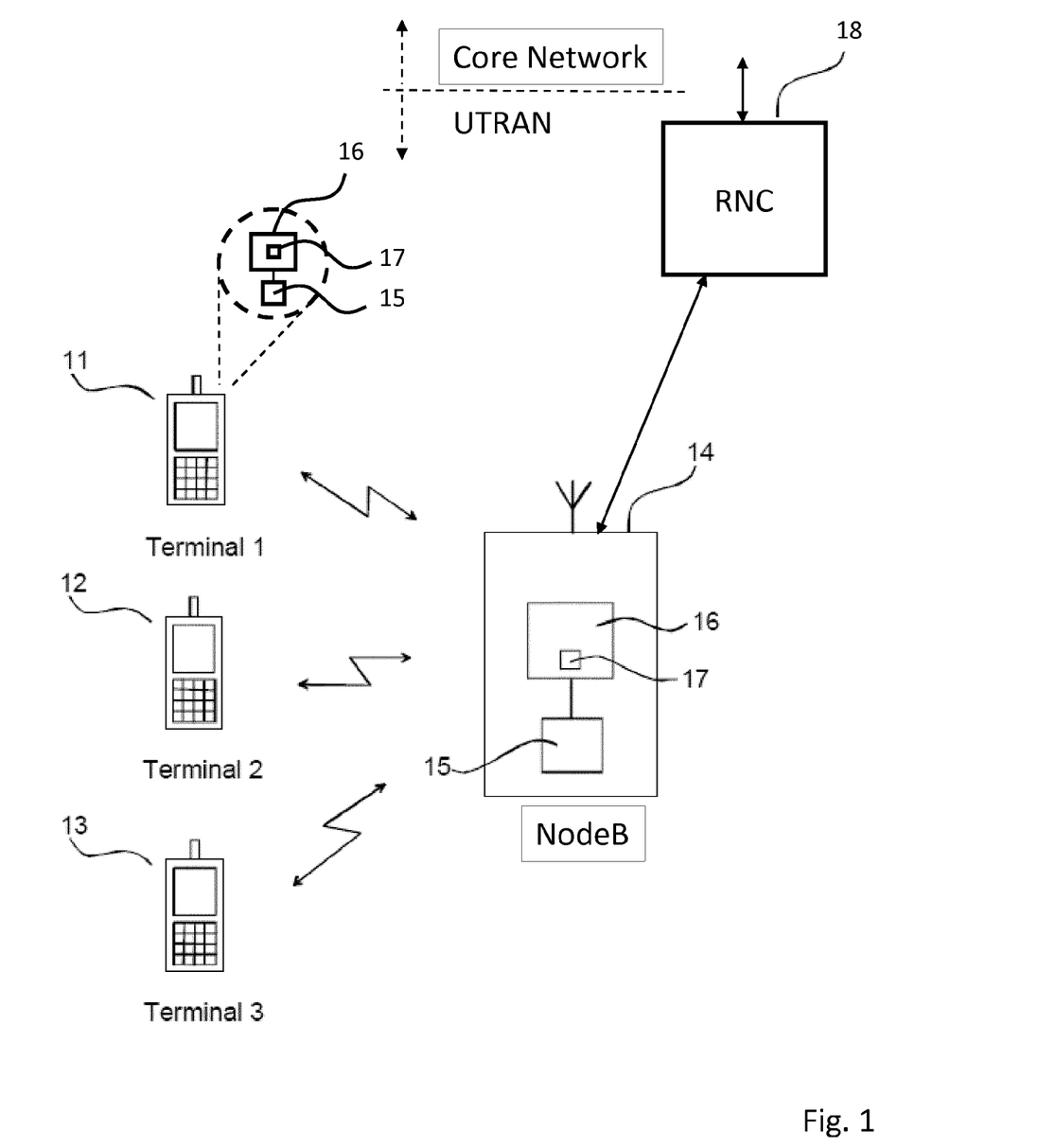
FIG. 1 illustrates a communications network in which the present invention may be implemented.

FIG. 1 illustrates a network of mobile terminals 11, 12, 13 communicating with a device 14 in the form of a NodeB (i.e. a base station), which in its turn communicates with a supervising entity in the form of an RNC 18. The network may comply with standards such as e.g. Long Term Evolution (LTE), Wideband Code Division Multiple Access (WCDMA), Code Division Multiple Access 2000 (CDMA2000), etc.

The RNC along with the NodeB and the mobile terminals, also referred to as user equipment (UE), make up the Universal Terrestrial Radio Access Network (UTRAN). This communications network is commonly referred to as 3G (3rd Generation Wireless Mobile Communication Technology), and facilitates connectivity between the mobile terminals 11, 12, 13 and the core network. The network of FIG. 1 is an example of a network in which the present invention advantageously may be implemented. As previously has been discussed, the method of pre-buffering one or more content data items to be rendered at a mobile terminal could be undertaken at the mobile terminal 11, 12, 13 at which the content is to be rendered, or alternatively, the content can be pre-buffered at a network node 14, 18 (i.e. the NodeB or the RNC) other than the mobile terminal for subsequent delivery of the pre-buffered content to the mobile terminal for rendering.

Figure 2:
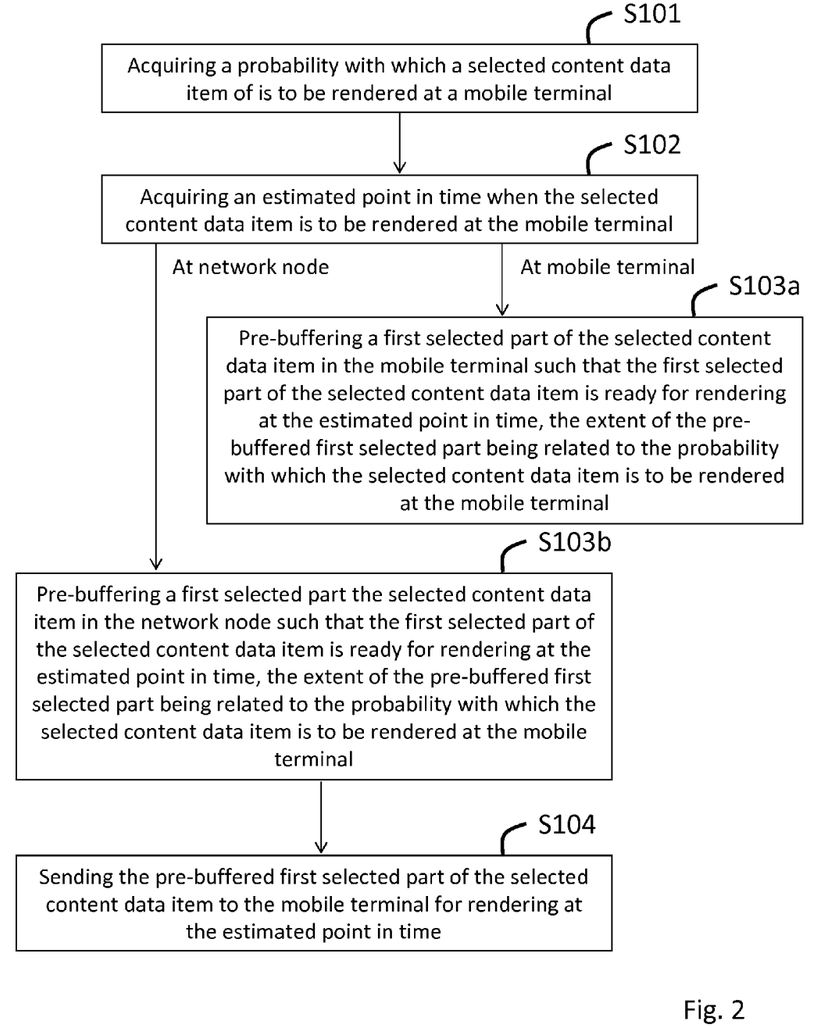
FIG. 2 shows a flowchart illustrating the method of pre-buffering one or more content data items to be rendered at a mobile terminal according to the two aspects of the present invention.

FIG. 2 shows a flowchart illustrating the method of pre-buffering one or more content data items to be rendered at a mobile terminal according to the two previously mentioned aspects of the present invention. In a first step S101, a probability with which at least one selected content data item of the one or more content data items is to be rendered at the mobile terminal is acquired. The probability is typically acquired from a recommender system specialized in extracting and providing this type of information. In a second step S102, an estimated point in time when the at least one selected content data item is to be rendered at the mobile terminal is acquired. The estimated point in time is generally also acquired from the recommender system, even though it alternatively can be envisaged that the mobile terminal of the user in fact holds this type of information. The first two steps S101 and S102 are typically undertaken at the respective device in which the selected content data item is to be pre-buffered, i.e. either at the mobile terminal or at the network node.

The recommender system may be based on collaborative filtering, content-based filtering, or a combination thereof, and may reside in the mobile terminal or in a network node of the mobile network, such as an RNC, eNodeB, BSC, etc. Further, the recommender system may be provided by a third party, e.g., a social network or a content provider. It will also be appreciated that the estimated probability and the estimated point in time may be acquired from different recommender systems.

With further reference to FIG. 2, in case a first selected part of the selected content data item is to be pre-buffered at the mobile terminal, after steps S101 and S102 have been undertaken at the mobile terminal, a third step S103a is undertaken at the mobile terminal, where the first selected part of the at least one selected content data item is pre-buffered in the mobile terminal such that the first selected part of said at least one selected content data item is ready for rendering at the determined point in time, the extent of the pre-buffered first selected part being related to the probability with which the at least one selected content data item is to be rendered at the mobile terminal.

Again with reference to FIG. 2, in case a first selected part of the selected content data item is to be pre-buffered at the network node (being an eNodeB, RNC, BSC, etc.), after steps S101 and S102 have been undertaken at the network node, a third step S103b is undertaken at the network node, where the first selected part of the at least one selected content data item is pre-buffered in the network node such that the first selected part of said at least one selected content data item is ready for rendering at the determined point in time, the extent of the pre-buffered first selected part being related to the probability with which the at least one selected content data item is to be rendered at the mobile terminal. Further, in a fourth step S104, the pre-buffered first selected part of the at least one selected content data item is sent from the network node to the mobile terminal such that the pre-buffered first selected part can be rendered at the estimated point in time.

In the following, it is elucidated how the extent, i.e., the size, of the first selected part of a selected content data item may be derived from the probability with which the item is to be rendered at the mobile terminal.

The percentage $f_i(P_i, T_i, N, \ldots)$ of each selected content data item i to be pre-buffered can be calculated as $$B = \sum_{i=1}^{n} f_i(P_i, T_i, N, \ldots) L_i,$$

where B is the total buffer size, n is the number of selected content data items to be pre-buffered, $L_i$ is the size of item i, $P_i$ is the estimated probability that item i is to be rendered at the mobile terminal, $T_i$ is the estimated point in time when the user wishes to render item i, and N is network related information, such as available network bandwidth. The function $f$ is user specific and may depend on further parameters, e.g., an availability of a content data item or the like. From this information, the mobile terminal can calculate how much of each content data item to download. The calculation can also be adjusted dynamically to improve the accuracy.

For instance, the percentage $f_i$ may be modeled as $$BP^{\alpha} N^{\beta}(T_i),$$

where $N^{\beta}(T_i)$ is the network load at estimated consumption time $T_i$, and parameters $\alpha$ and $\beta$ may be determined empirically. Therefore, since the total amount of data for all n selected content data items cannot exceed the buffer size B, the percentage $f_i$ may be expressed as $$f_i(P_i, T_i, N) = \frac{BP^{\alpha} N^{\beta}(T_i)}{\sum_{i=1}^{n} P^{\alpha} N^{\beta}(T_i) L_i}.$$

Note that the described way of calculating the extent of a selected content data item to be downloaded is only meant to elucidate the invention. Embodiments of the invention based on other algorithms may easily be envisaged.

With reference again to FIG. 1, whether the present invention is implemented at a mobile terminal 11, 12, 13 or a NodeB 14 (or any other appropriate device), the method of pre-buffering a selected content data item according to different embodiments of the present invention is in practice controlled by a processing unit 15 embodied in the form of one or more microprocessors arranged to execute a computer program 17 downloaded to a suitable storage medium 16 associated with the microprocessor, such as a Random Access Memory (RAM), a Flash memory or a hard disk drive. The processing unit 15 is arranged to at least partly carry out the method according to embodiments of the present invention when the appropriate computer program 17 comprising computer-executable instructions is downloaded to the storage medium 16 and executed by the processing unit 15. The storage medium 16 may also be a computer program product comprising the computer program 17. Alternatively, the computer program 17 may be transferred to the storage medium 16 by means of a suitable computer program product, such as a floppy disk or a memory stick. As a further alternative, the computer program 17 may be downloaded to the to storage medium 16 over a network. Further, the processing unit 15 typically pre-buffers the selected content data items according to embodiments of the present invention in the storage medium 16. The processing unit 15 may alternatively be embodied in the form of an application specific integrated circuit (ASIC), a field-programmable gate array (FPGA), a complex programmable logic device (CPLD), etc.

Figure 3:
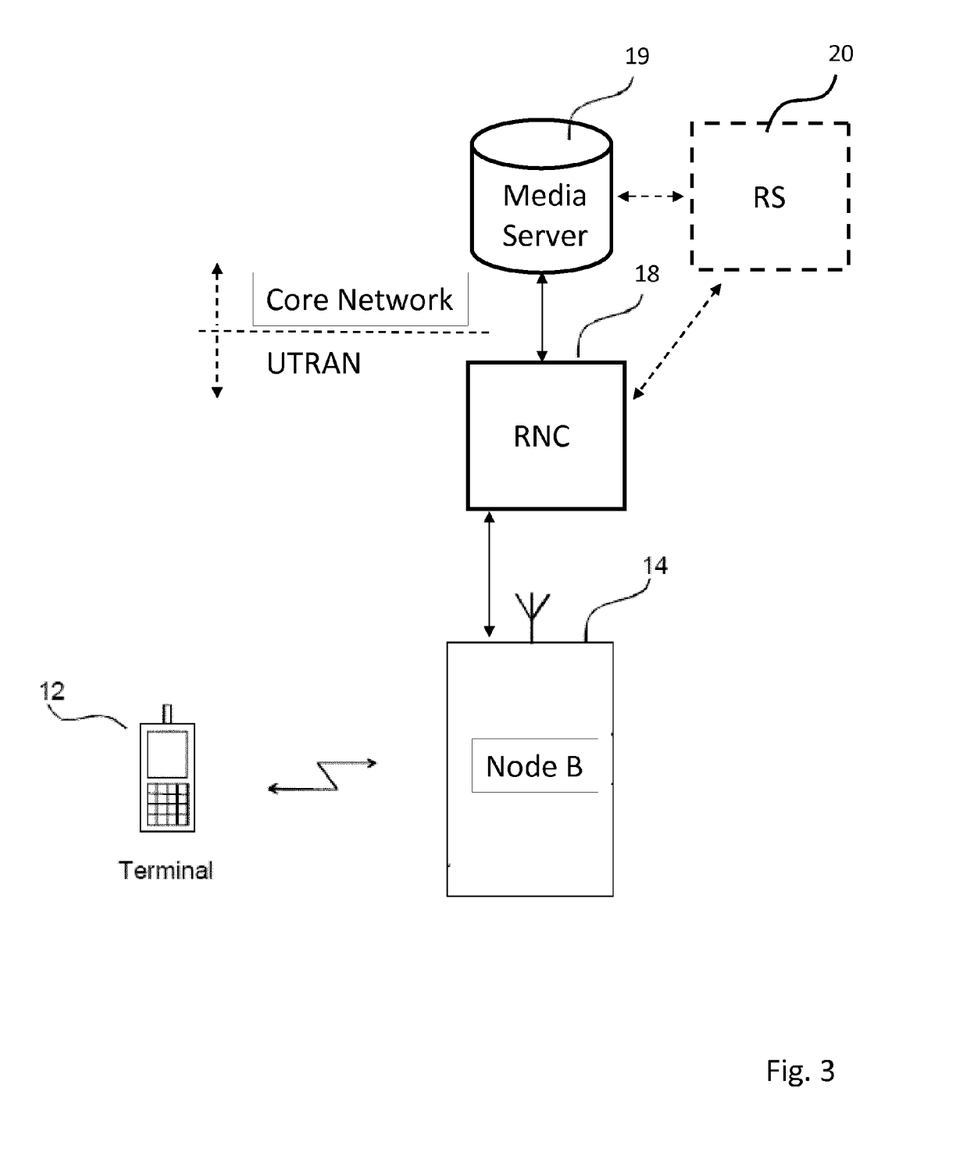
FIG. 3 illustrates an embodiment of the present invention in which the pre-buffering is undertaken at the mobile terminal and alternatively at a network node other than the mobile terminal.

Reference is made to FIG. 3 illustrating an embodiment of the present invention in which the pre-buffering is undertaken at the mobile terminal 12. FIG. 3 further shows a media server 19 providing content data items which a user of the mobile terminal 12 wishes to access. Hence, in an embodiment of the present invention, it is determined whether a user would want to render a particular content data item at subsequent point in time on his or her mobile terminal 12, being for example a mobile phone, a tablet or a laptop computer, based on an estimated probability measure. That is, an estimated probability with which the user would want to render the content is acquired. The mobile terminal 12 typically acquires such a probability measure from a recommender system. The probability measure may possibly be provided by, or at least via, the media server 19. Hence, the recommender system is implemented at the media server 19, or the media server 19 fetches the probability measure at a further third party entity hosting the recommender system 20 in the network. Alternatively, the recommender system 20 could provide the probability measure e.g. to the RNC 18. Further, an estimated point in time when the user wishes to render the particular content data item is acquired. The estimated point in time may also be provided by a recommender system. Again, this system may be operated by the media server 19 (or rather the content provider managing the media server). Alternatively, the mobile terminal 12 may itself comprise an application having access to information regarding media rendering habits of the user, meaning that the mobile terminal 12 can acquire the probability from the locally stored application. A first selected part of a selected content data item, e.g. a video clip, is pre-buffered in the mobile terminal 12 such that the user can start rendering the selected content data item at the point in time previously estimated. Thus, the first selected part is transported from the media server 19 located in the core network and into the UTRAN via the RNC 18, the NodeB 14 and finally to the mobile terminal 12. The extent to which the first selected part of the selected content data item is pre-buffered at the mobile terminal 12 is related to the acquired probability with which the user wishes to render the selected content data item.

In an example, a consumer of content, Bob, is recommended by his friend David to watch a video clip on his mobile terminal 12 (being e.g. a tablet) via a social network such as Facebook. Since Bob prefers a similar type of content as David with respect to for instance type of music or movies, the probability that Bob will watch the recommended clip is considered high, an estimated 90%. This may be compared to a probability threshold value (either at the mobile terminal 12 or at the recommendations system), of, say, 80%. Thus, if the estimated probability exceeds the threshold value, the likelihood that Bob will want to render the content is considered high enough. Bob normally watches video clips on his tablet on his way to and from work, i.e. either between 7 am and 8 am or between 5 pm and 6 pm, and during lunch hour which typically takes place between 12 pm and 1 pm. Based on this information, it is determined that 45% of the selected content data item is pre-buffered in the tablet such that Bob can start rendering the selected content data item at 7 am when he gets on his commuter train to work. If for instance a second selected content data item has an associated rendering probability for Bob of an estimated 80%, it may be determined that 40% of the selected item is pre-buffered for rendering at 7 am, while a third selected content data item has an associated rendering probability of an estimated 50%, wherein 25% of the selected item is pre-buffered for rendering at 7 am, and so on.

As previously has been discussed, other parameters may be taken into account when determining the extent to which a selected piece of content is pre-buffered, such as network load conditions (i.e. available network bandwidth), size of network node/mobile terminal buffer, availability of content, total size of the selected content data item, how many selected content data items that are to be pre-buffered such that they can be rendered at the estimated point in time, etc. Thus, in a further embodiment, the extent to which the first selected part of a selected content data item is pre-buffered is further related to a determined available network bandwidth measure. This measure can take into consideration both the available bandwidth at off-peak hours, which generally can take place hours before the point in time when the pre-buffered content data item is to be rendered, as well as available bandwidth at the actual point in time of rendering. This is highly advantageous in that the balancing network traffic load can be even further improved, since not only the time period when the first part of the content data item is to be pre-buffered is estimated, but further the extent to which the first selected part is pre-buffered at the network node/mobile terminal.

Hence, Bob is again recommended by his friend David to watch a video clip via a social network on his mobile terminal 12 with an estimated rendering probability of 90%. Bob normally watches video clips on his tablet 12 on his way to and from work, i.e. either between 7 am and 8 am or between 5 pm and 6 pm, and during lunch hour which typically takes place between 12 pm and 1 pm. In this example, it is further considered that the available bandwidth capacity at the estimated point in time when the content is to be rendered, i.e. at 7 am, is only 10%. Thus, it is predicted that bandwidth resources are relatively scarce at the time of rendering the content. In this particular example, it is decided that e.g. a further 20% of the selected content data item is pre-buffered in the tablet, i.e. 1.2×45%=54%, as compared to 45% in the previously given example. With this embodiment, the load on the network will advantageously be better balanced, since the first part of the content item is pre-buffered to a higher extent at off-peak hours, while a relatively smaller remaining part of the selected content data item is downloaded at an instant in time when the available bandwidth capacity is expected to be low. Thus, the first selected part is again transported from the media server 19 located in the core network and into the UTRAN via the RNC 18, the NodeB 14 and finally to the mobile terminal 12.

Conversely, if the available bandwidth capacity at the estimated point in time when the content is to be rendered is high, say 80%, it can be determined that a smaller part is to be pre-buffered, e.g. 0.8×45%=36%, as compared to the previously discussed 45%. With this embodiment, the load on the network will advantageously be better balanced, since the first selected part of the content item is pre-buffered to a lower extent at off-peak hours, while a relatively greater remaining part of the selected content data item is downloaded at an instant in time when the available bandwidth capacity is expected to be high.

Reference is again made to FIG. 3 illustrating an embodiment of the present invention in which the pre-buffering is undertaken at a network node other than the mobile terminal 12, i.e. at the RNC 18, the NodeB 14 or even at a proxy server (not shown) located in the core network between the media server 19 and the RNC 18. Again it is determined whether a user would want to render a particular content data item at subsequent point in time on his or her mobile terminal 12, being for example a mobile phone, a tablet or a laptop computer, based on an estimated probability measure. That is, an estimated probability with which the user would want to render the content is acquired. The network node at which the pre-buffering is undertaken, e.g. the NodeB 14, acquires such a probability measure from a recommender system. The probability measure may possibly be provided by, or at least via, the media server 19.

Further, an estimated point in time when the user wishes to render the particular content data item is acquired. The estimated point in time may also be provided by a recommender system to the NodeB 14. Again, this system may be operated by the media server 19 (or rather the content provider managing the media server). A first selected part of a selected content data item, e.g. a video clip, is pre-buffered in the NodeB 14 such that the user of the mobile terminal 12 can start rendering the selected content data item at the point in time previously estimated. Thus, the first selected part is transported from the media server 19 located in the core network and into the UTRAN via the RNC 18 to the NodeB 14. Subsequently, when the selected content is to be rendered by the user of the mobile terminal 12, the pre-buffered first selected part of the selected content data item is sent from the NodeB 14 to the mobile terminal 12.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method of pre-buffering one or more content data items to be rendered at a mobile terminal, the method comprising:
   acquiring a probability with which at least one selected content data item of the one or more content data items is to be rendered at the mobile terminal;
   acquiring an estimated point in time when the at least one selected content data item is to be rendered at the mobile terminal;
   acquiring an available bandwidth measure for a network in which the mobile terminal is located; and
   pre-buffering a first selected part of the at least one selected content data item in the mobile terminal such that the first selected part of the at least one selected content data item is ready for rendering at the estimated point in time, the extent to which the first selected part is pre-buffered being related to the probability with which the at least one selected content data item is to be rendered at the mobile terminal, the acquired available bandwidth measure, an availability of the at least one selected content data item, a total size of the at least one selected content data item, and a number of selected content data items of the one or more content data items that are to be pre-buffered such that the selected content data items can be rendered at the estimated point in time.

2. The method of claim 1, further comprising:
   buffering at least a second selected part of the at least one selected content data item in the mobile terminal while the pre-buffered first selected part is being rendered at the mobile terminal, wherein the at least second selected part is a remaining part of the at least one selected content data item.

3. The method of claim 1, further comprising:
   comparing the acquired probability to a probability threshold value, wherein
   the first selected part of the at least one selected content data item is pre-buffered if the acquired probability exceeds the probability threshold value.

4. The method of claim 1,
   wherein
   the pre-buffering of the first selected part of the at least one selected content data item is undertaken during time periods when the acquired available network bandwidth measure is considered sufficiently high.

5. The method of claim 4, further comprising:
   comparing the acquired available bandwidth measure to a bandwidth threshold value, wherein
   the first selected part of the at least one selected content data item is pre-buffered if the acquired available bandwidth measure exceeds the bandwidth threshold value.

6. The method of claim 1, wherein the extent to which the first selected part of the at least one selected content data item is pre-buffered being further related to a buffer size of the mobile terminal.

7. The method of claim 1, wherein the available bandwidth measure includes available bandwidth at off-peak hours and at an actual point in time of rendering the one or more content data items at the mobile terminal.

8. A method of pre-buffering one or more content data items to be rendered at a mobile terminal, the method comprising:
   acquiring a probability with which at least one selected content data item of the one or more content data items is to be rendered at the mobile terminal;
   acquiring an estimated point in time when the at least one selected content data item is to be rendered at the mobile terminal;
   acquiring an available bandwidth measure for a network in which the mobile terminal is located;
   pre-buffering a first selected part of the at least one selected content data item in the network node such that the first selected part of the at least one selected content data item is ready for rendering at the estimated point in time, the extent to which the first selected part is pre-buffered being related to the probability with which the at least one selected content data item is to be rendered at the mobile terminal, the acquired available bandwidth measure, an availability of the at least one selected content data item, a total size of the at least one selected content data item, and a number of selected content data items of the one or more content data items that are to be pre-buffered such that the selected content data items can be rendered at the estimated point in time; and
   sending the pre-buffered first selected part of the at least one selected content data item to the mobile terminal such that the pre-buffered first selected part can be rendered at the estimated point in time.

9. A mobile terminal for pre-buffering one or more content data items to be rendered at the mobile terminal, the mobile terminal comprising a processing unit being arranged to:
   acquire a probability with which at least one selected content data item of the one or more content data items is to be rendered at the mobile terminal;
   acquire an estimated point in time when the at least one selected content data item is to be rendered at the mobile terminal;
   acquire an available bandwidth measure for a network in which the mobile terminal is located; and
   pre-buffer a first selected part of the at least one selected content data item in the mobile terminal such that the first selected part of the at least one selected content data item is ready for rendering at the estimated point in time, the extent to which the first selected part is pre-buffered being related to the probability with which said at least one selected content data item is to be rendered at the mobile terminal, the acquired available bandwidth measure, an availability of the at least one selected content data item, a total size of the at least one selected content data item, and a number of selected content data items of the one or more content data items that are to be pre-buffered such that the selected content data items can be rendered at the estimated point in time.

10. The mobile terminal of claim 9, wherein the processing unit is further arranged to buffer at least a second selected part of the at least one selected content data item in the mobile terminal while the pre-buffered first selected part is being rendered at the mobile terminal, wherein the at least second selected part is a remaining part of the at least one selected content data item.

11. The mobile terminal of claim 9, wherein the processing unit is further arranged to:
   compare the acquired probability to a probability threshold value, wherein
   the first selected part of the at least one selected content data item is pre-buffered if the acquired probability exceeds the probability threshold value.

12. The mobile terminal of claim 9, wherein
   the pre-buffering of the first selected part of the at least one selected content data item is undertaken during time periods when the acquired available bandwidth measure is considered sufficiently high.

13. The mobile terminal of claim 12, wherein the processing unit is further arranged to:
   compare the acquired available bandwidth measure to a bandwidth threshold value, wherein
   the first selected part of the at least one selected content data item is pre-buffered if the acquired available bandwidth measure exceeds the bandwidth threshold value.

14. The mobile terminal of claim 9, wherein the mobile terminal is a mobile phone, a User Equipment (UE), a personal digital assistant (PDA), a smart phone, a tablet, a laptop, or a media player.

15. A network node arranged to pre-buffer one or more content data items to be rendered at a mobile terminal, the network node comprising a processing unit being arranged to:
   acquire a probability with which at least one selected content data item of the one or more content data items is to be rendered at the mobile terminal;
   acquire an estimated point in time when the at least one selected content data item is to be rendered at the mobile terminal;
   acquire an available bandwidth measure for a network in which the mobile terminal is located;
   pre-buffer a first selected part of the at least one selected content data item in the network node such that the first selected part of the at least one selected content data item is ready for rendering at the estimated point in time, the extent to which the first selected part is pre-buffered being related to the probability with which the at least one selected content data item is to be rendered at the mobile terminal, the acquired available bandwidth measure, an availability of the at least one selected content data item, a total size of the at least one selected content data item, and a number of selected content data items of the one or more content data items that are to be pre-buffered such that the selected content data items can be rendered at the estimated point in time; and
   send the pre-buffered first selected part of the at least one selected content data item to the mobile terminal such that the pre-buffered first selected part can be rendered at the estimated point in time.

16. The network node of claim 15, wherein the network node is a radio base station (RBS), a base transceiver station (BTS), a NodeB, an eNodeB, a radio network controller (RNC), a base station controller (BSC), or a proxy server.

17. A computer program product comprising a non-transitory computer readable medium storing a computer program comprising computer-executable instructions for causing a device to perform the method of claim 1.

18. A computer program product comprising a non-transitory computer readable medium storing a computer program comprising computer-executable instructions for causing a device to perform the method of claim 8.

* * * * *